Patented May 24, 1932

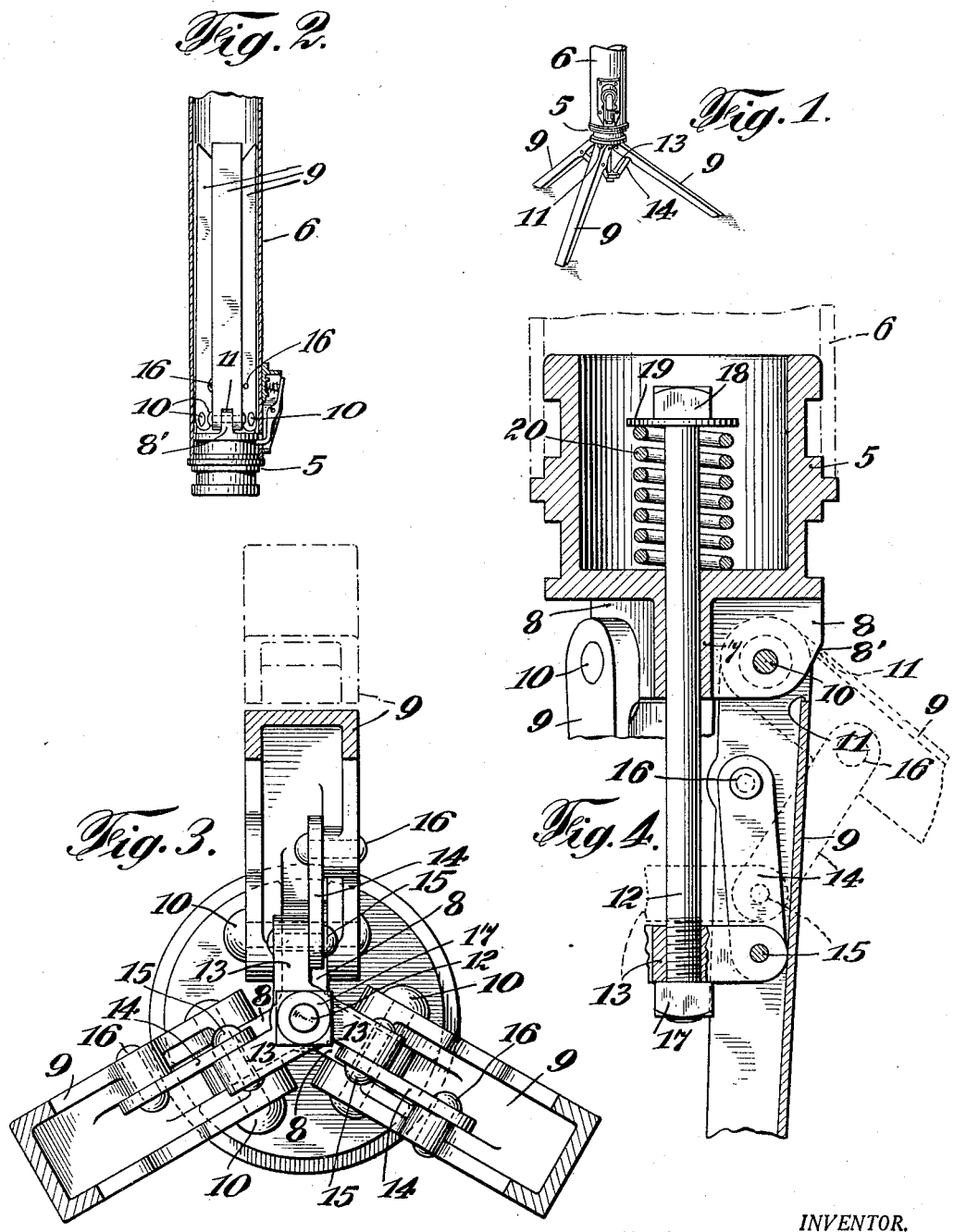

1,859,289

UNITED STATES PATENT OFFICE

HUBERT K. DALTON, OF STAMFORD, CONNECTICUT

TRIPOD OR SIMILAR SUPPORT

Application filed May 8, 1931. Serial No. 535,949.

This invention relates to tripods or similar supports, and has for its primary object and purpose to provide a very simple construction and mounting of the legs of a tripod upon the part to be supported and a single means common to all of the tripod legs for securely retaining the same in spread or set up relation to each other, and to also hold and retain said tripod legs in collapsed, closely compact relation to each other against relative movement.

More particularly, it is an important object of the invention in one embodiment thereof, to provide yieldable means upon the tripod head with which the supporting legs are pivotally connected embodying axially movable means connected with toggle links pivoted to the respective tripod legs to retain said links in the collapsed condition of the tripod in such relation to the pivoted ends of the tripod legs as to effectually resist any tendency of the casual pivoting movement of the legs from such collapsed positions.

It is a further object of my invention to provide such a yieldable connection between the supporting head of the tripod and the several pivoted legs thereof, that the movement of one of the legs from its set up position will automatically result in a corresponding collapsing movement of the remaining legs of the tripod.

With the above and other objects in view, the invention consists in the improved tripod and in the form, construction, and relative arrangement of the several parts thereof as will be hereinafter more fully described, illustrated in the accompanying drawings, and subsequently incorporated in the subjoined claims.

In the drawings, wherein I have illustrated one practical form of my invention, and in which similar reference characters designate corresponding parts throughout the several views,—

Figure 1 is a perspective view, showing the tripod set up in supporting position;

Fig. 2 shows the tripod collapsed and enclosed within a tubular post or standard;

Fig. 3 is a bottom plan view, the tripod legs being shown in section, and

Fig. 4 is a vertical sectional view, certain parts being broken away, the tripod being in collapsed condition and one of the legs thereof being illustrated in dotted lines in its expanded or set up position.

The subject matter of the present application constitutes an improvement upon a tripod of the form disclosed in my pending application for patent on signal flag and lamp stand devices, Serial No. 522,299, filed March 13, 1931. For convenience in illustration, I have shown therefore, in the drawings, the several relatively movable legs of the tripod associated with a coupling head generally indicated at 5 for connection with one end of a tubular post or standard 6 and which may be reversibly inserted within the end of the standard and detachably latched thereto so as to retain the collapsed tripod within the end of the standard, or in projecting relation thereto, all as disclosed in my pending application.

It will be understood, however, that the novel features of the present disclosure are not necessarily confined to such specific application, and the legs of the tripod may be directly connected to the end of the standard or other object to be supported. In either case, the coupling head 5 or the end of the post or standard is hollow, or provided with a chamber for a purpose which will presently become apparent. At the closed lower end of this chamber, the part 5 is formed with an external central tubular boss 7 and the radially positioned webs 8.

To each of the webs 8 a tripod leg 9 of channel shaped form in cross section as clearly shown in Fig. 3 of the drawings, is pivotally connected at one of its ends as at 10. The open side of the channeled leg 9 faces inwardly, and the intermediate wall of said leg at its pivoted end terminates in suitably spaced relation from the web 8 and as shown at 11, and is adapted, by abutting contact with the obliquely inclined edge 8' of the web, to limit the outward pivotal movement of the tripod leg to its set up position, as clearly shown in dotted lines in Fig. 4 of the drawings.

A rod 12 is axially movable through the guide bore 7 and the end wall of the part 5 and at one of its ends has a threaded connection with the multi-armed spider 13. To each arm of this spider a spreader link 14 is pivoted at one of its ends as at 15, and has its other end pivoted to one side flange of one of the tripod legs 9 as shown at 16. Preferably, a nut 17 is threaded upon the lower extremity of the rod 12 to detachably retain the spider 13 in connected relation therewith.

The other or upper end of the rod 12 is provided with a suitable head 18 and a washer plate 19. A coil spring 20 surrounding the rod 12 bears at its upper end against said washer plate and at its lower end against the base of part 5 and is under constant tension, tending to urge the rod 12 in an upward direction.

In the operation of the device as above described, it will be understood that when the tripod legs are in their collapsed positions as indicated in Figs. 2 and 4 of the drawings, the longitudinal edges of the side flanges of the respective legs are disposed substantially in contact, said legs converging towards each other from their pivoted ends 10 to their free ends. The legs of the tripod are retained in this close compact relationship by reason of the location of the link pivots 16. It will be noted from reference to Fig. 4 that in the folded or collapsed positions of the legs 9, these pivots will be located slightly inwardly of the pivots 15 connecting the other legs of the links 14 of the spider 13. Therefore, the action of the spring 20 maintaining an upward stress upon the lower link pivots 15 tends to urge the free ends of the tripod legs 9 inwardly towards each other, since the pivots 16 are also disposed slightly inwardly of the axes of the pivoted ends 10 of the legs 9. There is, however, sufficient play at the pivots 15 and 16 so that by grasping the lower free end of the tripod leg, it may be pulled outwardly to the expanded or set up position. After the three legs have been moved to their expanded positions, the spring 20 acting through the rod 12 and links 14 tends to maintain said legs in the same angular relation to the part 5 and in abutting contact with the edges 8' of the webs 8. The spreader links 14 in this position of the tripod legs are disposed at such an angle with respect to the spider 13 as to firmly brace the tripod legs, and necessitate a very strong manual pressure against the free end of the legs, in order to overcome the action of the spring 20. It will, however, be apparent that when such positive manual inward pressure is applied against one of the tripod legs, a corresponding movement will be transmitted through the spider 13 and the link connections therewith to each of the other legs of the tripod so that said legs will move together to their completely collapsed positions. When in such position, the spring 20 is under maximum compression so that as above stated, the tripod legs will be securely held against relative outward spreading movement. Thus, when the collapsed tripod is inserted within the hollow post or standard 6, no casual pivoting movement of the individual legs resulting in noisy contact of the same against the wall of the standard can occur.

From the foregoing description considered in connection with the accompanying drawings, the construction, manner of operation, and several advantages of my improved tripod will be clearly and fully understood. It will be seen that I have devised a very simple and effective and reliable means connecting the tripod legs with the post or standard support whereby the same will be securely retained in either their set up or collapsed positions, and which also enables the movement of the legs of the tripods to such positions to be easily and quickly accomplished. As heretofore noted, the drawings illustrate one possible embodiment of my present invention, but it is more or less apparent that the essential features thereof can also be incorporated in various other alternative structural forms, and I therefore, reserve the privilege of resorting to all such legitimate changes in the form, construction and relative arrangement of the detail parts thereof as may be fairly embodied within the spirit and scope of the invention as claimed.

I claim:

1. In a tripod, a plurality of supporting legs of channel shaped form in cross section, a hollow member having a central guide boss and webs radiating therefrom at one of its ends, pivot connections between one end of the tripod legs and the respective webs, said webs presenting stops for engagement of the transverse walls of the channel shaped legs therewith to limit outward spreading movement of said legs, a rod axially movable through said guide boss, a spider fixed to one end of said rod, spreader links pivoted to the arms of the spider extending upwardly therefrom and having their other ends pivotally connected to the respective tripod legs, and a spring housed within said hollow member coacting with said rod to constantly urge the same in one direction and yieldingly hold the legs in their maximum separated relation, or to yieldingly retain the same together with said spreader links in their folded collapsed positions.

2. In a tripod, a plurality of supporting legs, a member supported thereby and to which said legs are pivotally connected at one of their ends, a spider positioned between said legs and below the pivoted ends thereof, spreader links pivotally connected at one of their ends to the spider and extending upwardly therefrom and pivoted at their other ends to the respective tripod legs, the latter link pivots being disposed out of alignment with the leg pivots and disposed inwardly thereof and with respect to the pivotal connections between the links and said spider when the tripod is collapsed, and means mounted on said member including a part operatively connected with said spider to yieldably retain the tripod legs and spreader links in folded collapsed position.

3. In a tripod, a plurality of supporting legs, a member supported thereby and to which said legs are pivotally connected at one of their ends, a spider positioned between said legs and below the pivoted ends thereof, spreader links pivotally connected at one of their ends to the spider and extending upwardly therefrom and pivoted at their other ends to the respective tripod legs, the latter link pivots being disposed out of alignment with the leg pivots and disposed inwardly thereof and with respect to the pivotal connections between the links and said spider when the tripod is collapsed, means mounted on said member including a part connected to the spider and axially movable through said member, and spring means compressed in the inward movement of the tripod legs towards each other and coacting with said part to yieldingly retain the tripod legs and the spreader links in collapsed position.

4. In a tripod, a plurality of supporting legs, a hollow member supported thereby and to which said legs are pivotally connected at one of their ends, a spider positioned between said legs and below the pivoted ends thereof, spreader links pivotally connected at one of their ends to the spider and extending upwardly therefrom and pivoted at their other ends to the respective tripod legs, the latter link pivots being disposed out of alignment with the leg pivots and disposed inwardly thereof and with respect to the pivotal connections between the links and said spider when the tripod is collapsed, yieldable means housed within said hollow member, and an axially movable element connected with the spider and moved in one direction by said yieldable means to urge the tripod legs outwardly to their set up positions and to also yieldably retain the tripod legs and spreader links in their folded collapsed positions.

In testimony that I claim the foregoing as my invention, I have signed my name hereto.

HUBERT K. DALTON.